US012367717B2

(12) United States Patent
Miyazaki

(10) Patent No.: US 12,367,717 B2
(45) Date of Patent: Jul. 22, 2025

(54) ON-VEHICLE DEVICE, MANAGEMENT SYSTEM, AND UPLOAD METHOD

(71) Applicant: DENSO TEN Limited, Kobe (JP)

(72) Inventor: Hideaki Miyazaki, Kobe (JP)

(73) Assignee: DENSO TEN Limited, Kobe (JP)

( * ) Notice: Subject to any disclaimer, the term of this patent is extended or adjusted under 35 U.S.C. 154(b) by 253 days.

(21) Appl. No.: 18/172,117

(22) Filed: Feb. 21, 2023

(65) Prior Publication Data

US 2023/0274585 A1 Aug. 31, 2023

(30) Foreign Application Priority Data

Feb. 28, 2022 (JP) ................................ 2022-029598

(51) Int. Cl.

| | |
|---|---|
| ***G07C 5/00*** | (2006.01) |
| ***G07C 5/02*** | (2006.01) |
| ***G07C 5/04*** | (2006.01) |
| ***G07C 5/08*** | (2006.01) |

(52) U.S. Cl.
CPC ............... *G07C 5/008* (2013.01); *G07C 5/04* (2013.01); *G07C 5/02* (2013.01); *G07C 5/0866* (2013.01)

(58) Field of Classification Search
CPC ........ G07C 5/0866; G07C 5/04; G07C 5/008; G07C 5/02
See application file for complete search history.

(56) References Cited

U.S. PATENT DOCUMENTS

| | | | | |
|---|---|---|---|---|
| 9,037,412 | B2 * | 5/2015 | Schwanhäuser | G07C 5/008 701/537 |
| 9,352,689 | B2 * | 5/2016 | Kim | B60W 10/20 |
| 10,326,935 | B1 * | 6/2019 | Tsai | H04N 7/183 |
| 10,762,775 | B2 * | 9/2020 | Youm | G08G 1/0112 |
| 2022/0101663 | A1 * | 3/2022 | Ueda | G07C 5/008 |
| 2023/0260334 | A1 * | 8/2023 | Di Francesco | G06V 20/56 701/1 |

FOREIGN PATENT DOCUMENTS

| | | | | |
|---|---|---|---|---|
| CN | 106997681 A * | 8/2017 | | G08G 1/123 |
| JP | 2010-108351 | 5/2010 | | |

* cited by examiner

*Primary Examiner* — Kito R Robinson
*Assistant Examiner* — Anthony Gabriel Mora
(74) *Attorney, Agent, or Firm* — Oliff PLC

(57) ABSTRACT

An on-vehicle device uploads vehicle information that includes running information concerning a running state of a vehicle and image information that is captured by the vehicle to an external device, and includes a processor that uploads the vehicle information to an external device at a timing when a running distance of the vehicle reaches a threshold distance.

14 Claims, 5 Drawing Sheets

ON-VEHICLE DEVICE, MANAGEMENT SYSTEM, AND UPLOAD METHOD

CROSS-REFERENCE TO RELATED APPLICATION(S)

This application is based upon and claims the benefit of priority to Japanese Patent Application No. 2022-029598, filed on Feb. 28, 2022, the entire contents of which are herein incorporated by reference.

FIELD

A disclosed embodiment(s) relate(s) to an on-vehicle device, a management system, and an upload method.

BACKGROUND

A management system has conventionally been provided that uploads an video that is captured by a dashboard camera that is mounted on a vehicle to a server device. For example, such a management system transmits an uploaded video to a preliminarily set address in a server device in a case where a shock is detected by a dashboard camera (see, for example, Japanese Laid-open Patent Publication No. 2010-108351)

However, a conventional technique has to upload all videos to a server device temporarily and has room for improvement in reducing an amount of data that are uploaded.

SUMMARY

An on-vehicle device according to an aspect of an embodiment is an on-vehicle device that uploads vehicle information that includes running information concerning a running state of a vehicle and image information that is captured by the vehicle to an external device, wherein the on-vehicle device includes a processor that uploads the vehicle information to an external device at a timing when a running distance of the vehicle reaches a threshold distance.

BRIEF DESCRIPTION OF DRAWING(S)

DESCRIPTION OF EMBODIMENT(S)

Hereinafter, an embodiment(s) of an on-vehicle device, a management system, and an upload method as disclosed in the present application will be explained in detail with reference to the accompanying drawing(s). Additionally, the present invention is not limited by an embodiment(s) as illustrated below.

Figure 1:
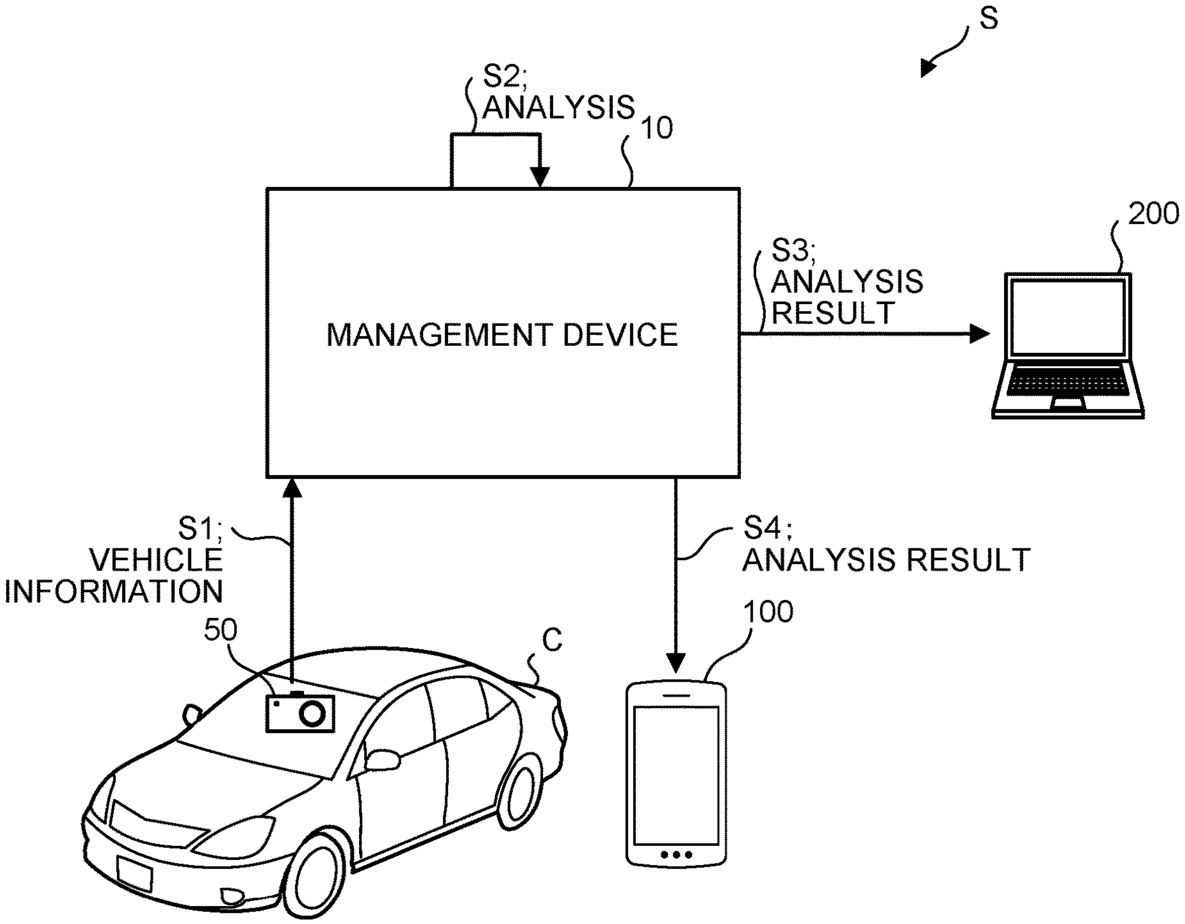
FIG. 1 is a diagram that illustrates an outline of a management system.
Figure 2:
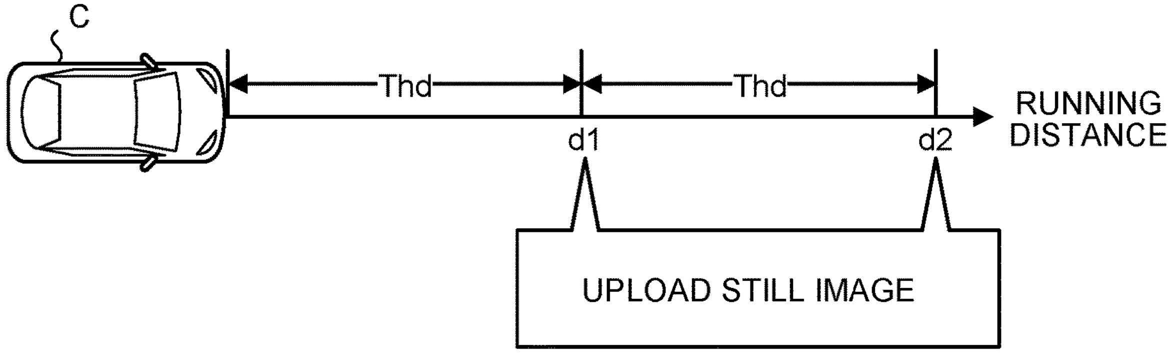
FIG. 2 is a diagram that illustrates an outline of an upload method.

First, an outline of an on-vehicle device, a management system, and an upload method according to an embodiment will be explained by using FIG. 1 and FIG. 2. FIG. 1 is a diagram that illustrates an outline of a management system. FIG. 2 is a diagram that illustrates an outline of an upload method.

As illustrated in FIG. 1, a management system S according to an embodiment is, for example, a system that executes various types of analyses concerning driving such as safe driving and/or eco-driving of a driver. Furthermore, for example, the management system S is introduced into a delivery company that provides a delivery vehicle such as a taxi and/or a truck, as well as a business operator that has a business vehicle.

As illustrated in FIG. 1, the management system S according to an embodiment includes a management device 10 and an on-vehicle device 50. The on-vehicle device 50 is, for example, a dashboard camera with a communication function.

The on-vehicle device 50 uploads vehicle information that includes running information concerning a running state of a vehicle C and image information that is captured by such a vehicle C to the management device 10. Additionally, although image information is, for example, information concerning a captured image of a front side of a vehicle C, it may be information concerning a captured image of a periphery of such a vehicle C and/or an inside (for example, a driver seat) of such a vehicle C.

Furthermore, running information is, for example, information that is detected by various types of sensors that are provided to a vehicle C. For example, running information includes positional information, vehicle speed information, acceleration information, steering information, etc., of a vehicle C.

The management device 10 analyzes vehicle information that is acquired from each on-vehicle device 50 so as to evaluate a current situation of each vehicle C and/or driving of a driver. Additionally, for example, the management device 10 is configured as a cloud server that provides a cloud service through a network such as the Internet and/or a mobile phone line network.

Furthermore, as illustrated in FIG. 1, the management device 10 is connected to a driver terminal 100 and/or a manager terminal 200 through a network. The driver terminal 100 is a terminal that is possessed by a driver of each vehicle C and is a smartphone in an example as illustrated in FIG. 1.

The manager terminal 200 is a terminal that is possessed by a manager that manages a driving situation, etc., of each vehicle C, and is a notebook Personal Computer (PC) in an example as illustrated in FIG. 1. For example, the manager terminal 200 displays information that is notified of from the management device 10 so as to notify a manager of a current situation of each vehicle C, an evaluation result for each driver, etc.

Herein, an outline of information processing according to an embodiment will be explained by using FIG. 1. For example, the management device 10 acquires vehicle information from the on-vehicle device 50 with a predetermined period (step S1) and analyzes acquired vehicle information (step S2). For example, the management device 10 executes evaluation of a current situation of each vehicle C, driving of a driver, etc., based on each vehicle information.

Subsequently, the management device 10 notifies the manager terminal 200 of an evaluation result concerning a current situation of each vehicle C (for example, a current place and/or a running route of a vehicle C) and/or a driving evaluation (step S3).

For example, the management device 10 executes processes at such steps S1 to S3 periodically and notifies the driver terminal 100 of an analysis result (for example, a result of a driving evaluation) at any timing, for example, at a time of close of business, etc. (step S4).

In such a management system S, overlapping of image information that is uploaded periodically is caused, for example, in a case where each on-vehicle device 50 is stopped, etc. More specifically, for example, as image information is uploaded at a time interval(s) within a time period when a vehicle C is stopped or reduces a speed thereof, a case where a change between image information that is uploaded previously and image information that is uploaded currently is absent is also supposed.

In such a case, it is possible to replace image information that is uploaded currently with image information that is uploaded previously. That is, in such a case, image information that is uploaded currently does not have to be uploaded substantially.

As this point is focused on, in an upload method according to an embodiment, image information is uploaded depending on a running distance. Specifically, as illustrated in FIG. 2, in an upload method according to an embodiment, in a case where a running distance of a vehicle C reaches a threshold distance Thd, a still image that is captured at a time when reaching such a threshold distance Thd is uploaded.

In an example as illustrated in FIG. 2, a case is illustrated where still images are uploaded that are captured at a point d1 that is distant from a current place of a vehicle C by a threshold distance Thd and a point d2 that is further distant from such a point d1 by such a threshold distance Thd.

That is, in an upload method according to an embodiment, a still image is uploaded based on, not an elapsed time from previous uploading but a running distance, so that, for example, it is possible to reduce uploading of an overlapping still image.

Therefore, in an upload method according to an embodiment, uploading of an unwanted still image is avoided, so that it is possible to attain reduction of an amount of data that are uploaded.

Figure 3:
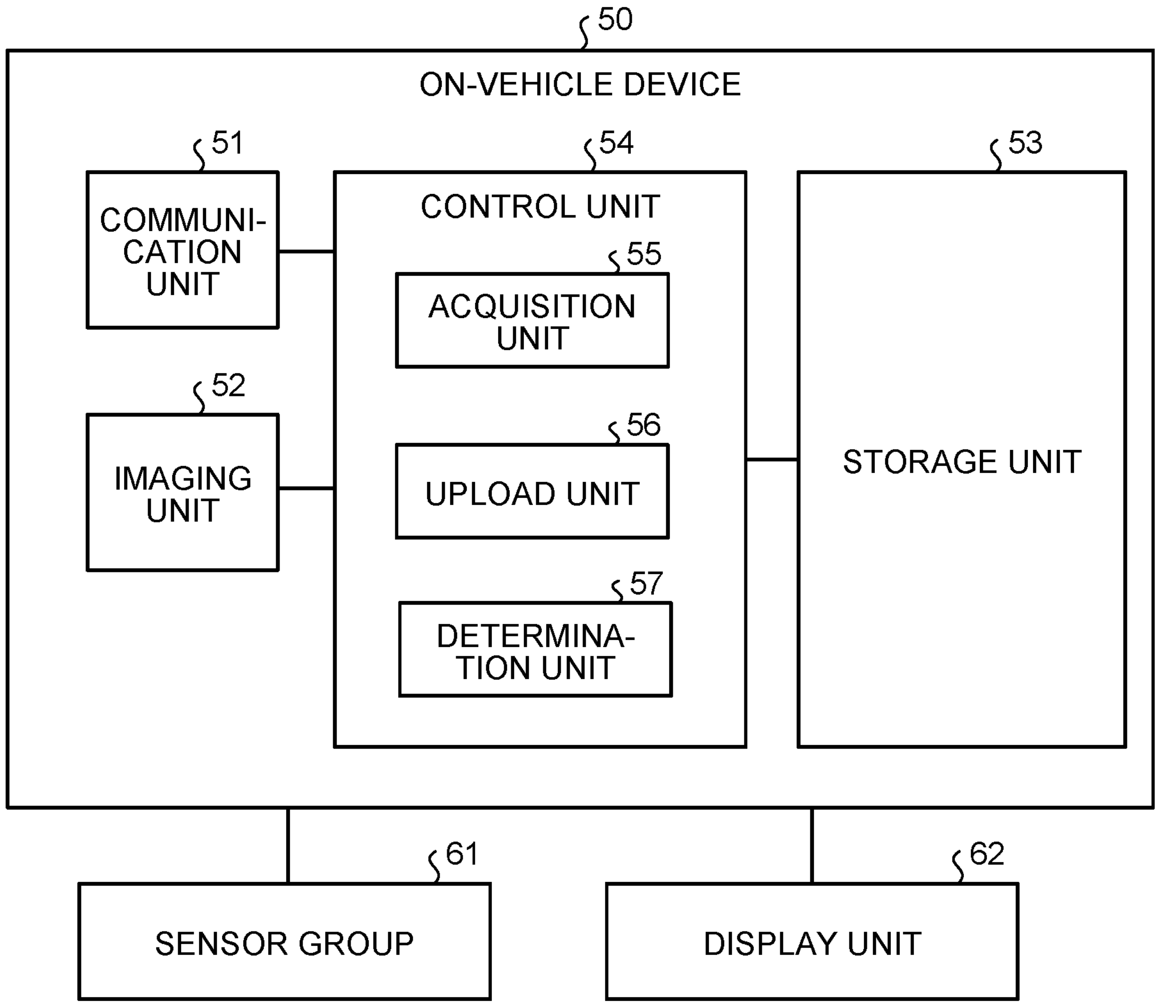
FIG. 3 is a block diagram of an on-vehicle device.

Next, a configuration example of an on-vehicle device 50 will be explained by using FIG. 3. FIG. 3 is a block diagram of the on-vehicle device 50. As illustrated in FIG. 3, the on-vehicle device 50 includes a communication unit 51, an imaging unit 52, a storage unit 53, and a control unit (a processor) 54. Furthermore, the on-vehicle device 50 is connected to a sensor group 61 and a display unit 62.

The sensor group 61 includes various types of sensors that detect, for example, a running state of a vehicle C. Such a sensor group 61 includes a vehicle speed sensor, a brake sensor, a steering angle sensor, an acceleration sensor, a position sensor, an obstacle detection sensor, etc.

The display unit 62 is a touch panel display that is mounted on a vehicle C. For example, the display unit 62 displays a video that is input from the on-vehicle device 50. Additionally, the display unit 62 may have a speaker so as to output a sound that is input from the on-vehicle device 50.

The communication unit 51 is realized by, for example, a Network Interface Card (NIC), etc. The communication unit 51 is connected to a predetermined communication network so as to be two-way-communicable and executes transmission/receipt of information, with a management device 10, etc.

The imaging unit 52 includes various types of imaging elements and captures an image of a periphery of a vehicle C. Additionally, the on-vehicle device 50 may be configured to have the imaging unit 52 that captures an image of an inside (for example, a driver) of a vehicle.

The storage unit 53 is a storage unit that is composed of a storage device such as, for example, a non-volatile memory, a data flash, and/or a hard disk drive, and stores various types of information that is input from the imaging unit 52 and the sensor group 61.

The control unit 54 includes an acquisition unit 55, an upload unit 56, and a determination unit 57, and includes a computer that has, for example, a Central Processing Unit (CPU), a Read Only Memory (ROM), a Random Access Memory (RAM), a hard disk drive, an input/output port, etc., and/or various types of circuits.

A CPU of a computer reads and executes a program that is stored in, for example, a ROM, so as to function as the acquisition unit 55, the upload unit 56, and the determination unit 57 of the control unit 54.

The acquisition unit 55 acquires vehicle information that includes image information that is captured by the imaging unit 52 and various types of running information that is input from the sensor group 61. Furthermore, the acquisition unit 55 stores acquired vehicle information in the storage unit 53. Additionally, the acquisition unit 55 may compress image information and store it in the storage unit 53.

The upload unit 56 uploads vehicle information that is acquired by the acquisition unit 55 to the management device 10 with a predetermined period. For example, the upload unit 56 uploads vehicle information at an upload timing that is determined by the determination unit 57 as described later.

Vehicle information that is uploaded by the upload unit 56 at an upload timing includes running information that is newly obtained after previous uploading and a still image that is captured at such an upload timing.

Furthermore, the upload unit 56 uploads vehicle information with a type and a time period that are specified by the management device 10 to the management device 10 in a case where a request is provided from the management device 10. In such a case, for example, the upload unit 56 uploads a video that is captured within a time period that is specified by the management device 10 to the management device 10.

That is, the upload unit 56 uploads, for running information, information for all time periods, and uploads, for image information, a still image that is captured at an upload timing.

Then, the upload unit 56 uploads a video within a specified time period to the management device 10, for example, in a case where a request is provided from the management device 10. Thereby, it is possible to attain reduction of an amount of data that are uploaded, as compared with a case where a video is uploaded regularly.

Additionally, for example, a case where it is not possible to upload vehicle information at an upload timing depending on a communication environment such as an outside of a communication area is also supposed. Hence, for example, in a case where it is not possible to upload vehicle information, the upload unit 56 may execute collective uploading at a next upload timing.

That is, all of still images that are not capable of being uploaded may be uploaded at a next upload timing. Thereby, it is possible to upload minimal information that is needed for the management device 10 appropriately.

The determination unit 57 determines an upload timing for vehicle information based on a running distance of a vehicle C. For example, the determination unit 57 counts a cumulative running distance of a vehicle C and determines, as an upload timing, a timing when such a cumulative running distance reaches a threshold distance thd.

Furthermore, as a cumulative running distance of a vehicle C reaches a threshold distance thd, the determination unit 57 resets a count(s) of such a cumulative running distance. That is, the on-vehicle device 50 uploads vehicle information at a distance interval(s) where a cumulative running distance reaches a threshold distance thd.

Furthermore, for example, the determination unit 57 determines an upload timing based on an elapsed time in a case where a vehicle C is stopped (for example, a speed thereof is zero). In such a case, for example, the determination unit 57 counts an elapsed time from previous uploading and determines, as an upload timing, a timing when it reaches a predetermine threshold time.

That is, in such a case, a still image is uploaded at a time interval(s). Furthermore, herein, the determination unit 57 may instruct the upload unit 56 to upload a still image of an inside of a vehicle C that is captured. That is, in such a case, a still image is uploaded at a time interval(s), so that it is possible to notify the management device 10 of a change of a situation (for example, dozing of a driver, etc.) inside a vehicle at a time of stoppage thereof.

Figure 4:
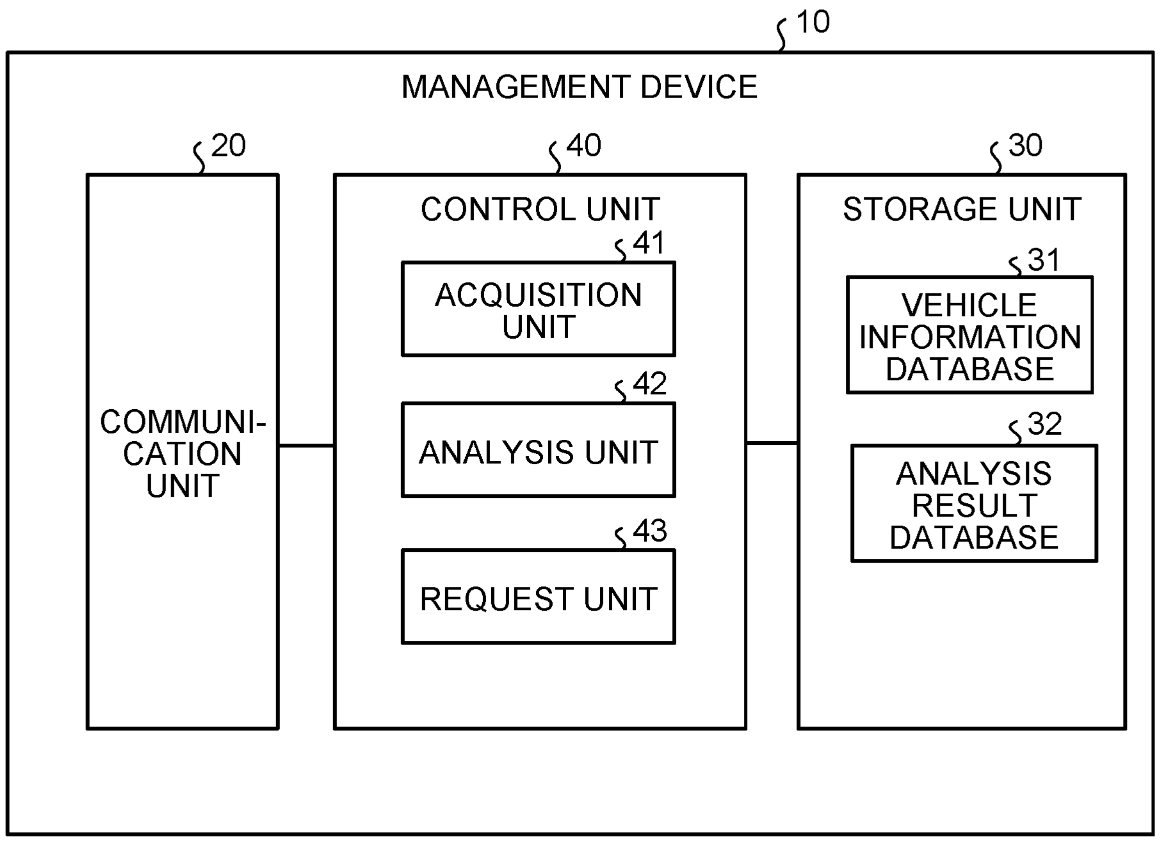
FIG. 4 is a block diagram of a management device.

Subsequently, a configuration example of a management device 10 will be explained by using FIG. 4. As illustrated in FIG. 4, the management device 10 according to an embodiment includes a communication unit 20, a storage unit 30, and a control unit 40.

The communication unit 20 is realized by, for example, a Network Interface Card (NIC), etc. The communication unit 20 is connected to a predetermined communication network so as to be two-way-communicable and executes transmission/receipt of information, with an on-vehicle device 50, etc.

The storage unit 30 is a storage unit that is composed of a storage device such as, for example, a non-volatile memory, a data flash, and/or a hard disk drive. As illustrated in FIG. 4, the storage unit 30 has a vehicle information database 31 and an analysis result database 32.

The vehicle information database 31 is a database that stores vehicle information that is acquired from each on-vehicle device 50. The analysis result database 32 is a database that stores an analysis result for vehicle information that is acquired from each on-vehicle device 50.

The control unit 40 includes an acquisition unit 41, an analysis unit 42, and a request unit 43, and includes a computer that has, for example, a Central Processing Unit (CPU), a Read Only Memory (ROM), a Random Access Memory (RAM), a hard disk drive, an input/output port, etc., and/or various types of circuits.

A CPU of a computer reads and executes a program that is stored in, for example, a ROM, so as to function as the acquisition unit 41, the analysis unit 42, and the request unit 43 of the control unit 40.

The acquisition unit 41 acquires vehicle information of each vehicle C from each on-vehicle device 50 with a predetermined period, and further, acquires vehicle information that is uploaded from the on-vehicle device 50, based on a request that is provided by the request unit 43 as described later. The acquisition unit 41 stores acquired vehicle information in the vehicle information database 31.

The analysis unit 42 analyzes vehicle information that is acquired by the acquisition unit 41. For example, the analysis unit 42 analyzes a current situation of each vehicle C or a driver thereof. Furthermore, for example, the analysis unit 42 evaluates driving that is executed by a driver of each vehicle C as a part of analysis.

For example, an analysis result that is provided by the analysis unit 42 is stored in the analysis result database 32 and a manager terminal 200 (see FIG. 1) is also notified thereof.

The request unit 43 requests vehicle information from the on-vehicle device 50, based on an analysis result that is provided by the analysis unit 42. Additionally, the request unit 43 may request, from the on-vehicle device 50, vehicle information with an information type and a time period that are specified by the manager terminal 200 that is notified of an analysis result that is provided by the analysis unit 42, or may request vehicle information autonomously. In a case where vehicle information is requested autonomously, for example, whether or not such vehicle information satisfies a predetermined condition is determined and vehicle information that is linked to such a condition is requested from the on-vehicle device 50.

Figure 5:
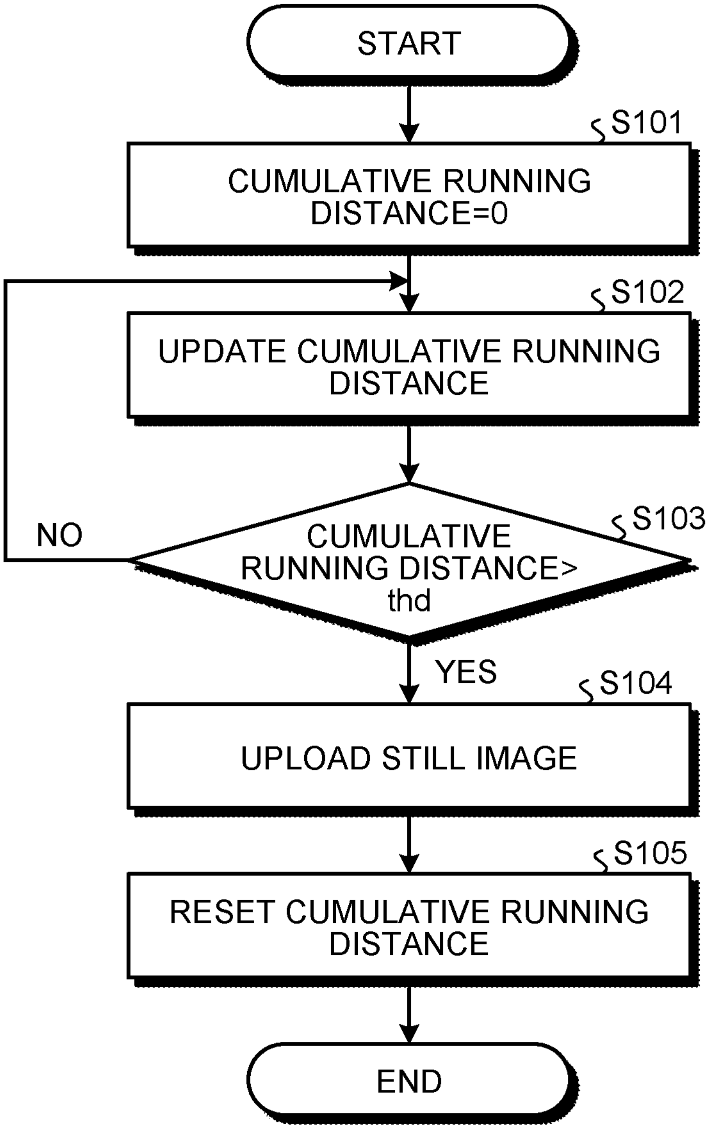
FIG. 5 is a flowchart that illustrates a process procedure that is executed by an on-vehicle device.
Figure 6:
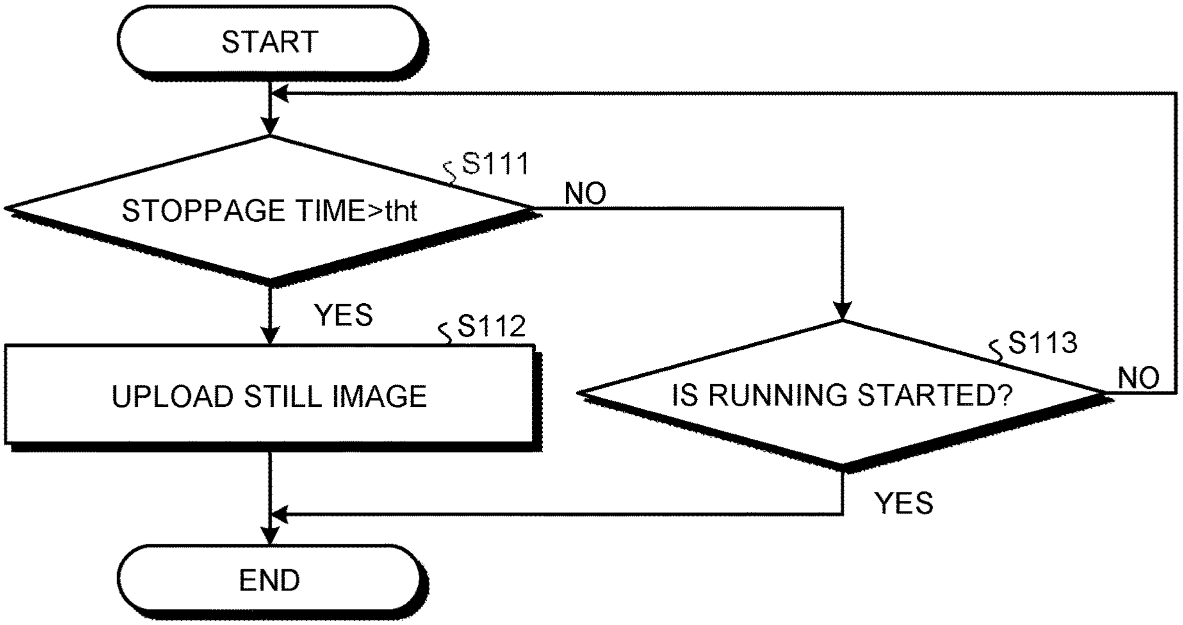
FIG. 6 is a flowchart that illustrates a process procedure that is executed by an on-vehicle device.

Next, a process procedure that is executed by an on-vehicle device 50 according to an embodiment will be explained by using FIG. 5 and FIG. 6. FIG. 5 and FIG. 6 are flowcharts that illustrates a process procedure that is executed by the on-vehicle device 50.

First, a process procedure of the on-vehicle device 50 in a case where a vehicle C is running will be explained by using FIG. 5. As illustrated in FIG. 5, the on-vehicle device 50 provides a cumulative running distance of a vehicle C=0 (step S101) and updates such a cumulative running distance (step S102).

Subsequently, the on-vehicle device 50 determines whether or not a cumulative running distance reaches a threshold distance thd (step S103). The on-vehicle device 50 moves to a process at step S104 in a case where a cumulative running distance reaches a threshold distance thd (step S103; Yes) or returns to a process at step S102 in a case where such a cumulative running distance does not reach such a threshold distance thd (step S103; No).

Subsequently, the on-vehicle device 50 uploads an image that is captured at a time when a cumulative running distance reaches a threshold distance thd (step S104), resets such a cumulative running distance (step S105), and ends a process.

Next, a process procedure of the on-vehicle device 50 in a case where a vehicle C is stopped will be explained by using FIG. 6. As illustrated in FIG. 6, the on-vehicle device 50 determines whether or not a stoppage time of a vehicle C reaches a threshold time tht (step S111).

The on-vehicle device 50 moves to a process at step S112 in a case where it is determined that a stoppage time reaches a threshold time tht (step S111; Yes) or moves to a process at step S113 in a case where it is determined that such a stoppage time does not reach such a threshold time tht (step S111; No).

Subsequently, the on-vehicle device 50 uploads a still image that is captured at a time when a stoppage time reaches a threshold time tht (step S112), and ends a process. Furthermore, the on-vehicle device 50 determines whether or not a vehicle C starts to run, at step S113.

The on-vehicle device 50 ends a process in a case where it is determined that a vehicle C starts to run (step S113; Yes), and transfers to a process flow in FIG. 5. Furthermore, the on-vehicle device 50 returns to a process at step S111 in a case where it is determined that such a vehicle C does not start to run (step S113; No).

As described above, an on-vehicle device 50 according to an embodiment is an on-vehicle device that uploads vehicle information that includes running information concerning a running state of a vehicle C and image information that is captured by the vehicle C to an external device, and includes a control unit 54 (a processor) that uploads the vehicle information to an external device at a timing when a running distance of the vehicle C reaches a threshold distance. Therefore, it is possible for an on-vehicle device 50 according to an embodiment to reduce an amount of data that are uploaded.

Additionally, although a case where the management device 10 is a server or a cloud system that aggregates vehicle information from each on-vehicle device 50 has been explained in an embodiment as described above, this is not limiting. A part or all of functions of the management device 10 may be provided to the on-vehicle device 50. That is, the management device 10 may be the on-vehicle device 50.

Furthermore, although a still image has been explained as an example in an embodiment as described above, an animation may be provided. In such a case, an animation with a short duration may be uploaded intermittently.

Furthermore, in a case where a continuous animation is uploaded periodically, it is preferable to change a timing of a start or a timing of an end of an animation that is uploaded, depending on a running distance. In such a case, a timing when a change of a running distance is decreased so as to be 0, that is, a timing of stoppage is provided as a timing of an end of an animation that is uploaded, so as to reduce an overlapping video. Furthermore, similarly, it is preferable that a timing when a change of a running distance is increased from 0, that is, a timing of starting is provided as a timing of a start of an animation that is uploaded.

According to an aspect of an embodiment, it is possible to reduce an amount of data that are uploaded.

Appendix (1): An on-vehicle device that uploads vehicle information that includes running information concerning a running state of a vehicle and image information that is captured by the vehicle to an external device, wherein the on-vehicle device includes a processor that uploads the vehicle information to an external device at a timing when a running distance of the vehicle reaches a threshold distance.

Appendix (2): The on-vehicle device according to Appendix (1), wherein the processor uploads the image information that is captured by the vehicle as the running information to the external device at a time when reaching the threshold distance.

Appendix (3): The on-vehicle device according to Appendix (2), wherein the processor uploads the image information of an outside of the vehicle that is captured, as the image information.

Appendix (4): The on-vehicle device according to Appendix (1), (2), or (3), wherein the processor uploads the running information to the external device at a timing that is based on an elapsed time from previous uploading.

Appendix (5): The on-vehicle device according to any one of Appendices (1) to (4), wherein the processor uploads the vehicle information in a case where the vehicle is stopped and in a case where a stoppage time thereof reaches a threshold time.

Appendix (6): The on-vehicle device according to any one of Appendices (1) to (5), wherein the processor uploads, in a case where it is not possible to upload the vehicle information at a timing of uploading, a previous one collectively at a timing of next uploading.

Appendix (7): A management system, comprising the on-vehicle device according to any one of Appendices (1) to (6), and a management device that aggregates and manages information that is uploaded from the on-vehicle device.

Appendix (8): An upload method, wherein a processor uploads vehicle information that includes running information concerning a running state of a vehicle and image information that is captured by the vehicle to an external device, and the upload method uploads the vehicle information to an external device at a timing when a running distance of the vehicle reaches a threshold distance.

It is possible for a person(s) skilled in the art to readily derive an additional effect(s) and/or variation(s). Hence, a broader aspect(s) of the present invention is/are not limited to a specific detail(s) and a representative embodiment(s) as illustrated and described above. Therefore, various modifications are possible without departing from the spirit or scope of a general inventive concept that is defined by the appended claim(s) and an equivalent(s) thereof.

What is claimed is:

1. An on-vehicle device located on a vehicle, the on-vehicle device comprising:
   - a camera provided on the vehicle; and
   - a processor configured to upload a still image captured by the camera provided on the vehicle to a management computer located externally of the vehicle, wherein
     - (a) when the vehicle is moving, the processor uploads the still image each time that the vehicle has moved by a running distance equal to a threshold distance, and
     - (b) when the vehicle is stopped, the processor uploads the still image periodically at a constant time interval.

2. The on-vehicle device according to claim 1, wherein the processor is further configured to upload running information concerning a running state of the vehicle in addition to the still image captured by the camera.

3. The on-vehicle device according to claim 1, wherein the still image is of an outside of the vehicle.

4. The on-vehicle device according to claim 1, wherein:
   - the processor is further configured to upload, in a case where it is not possible to upload the still image at an initial timing of uploading, the still image that was not able to be uploaded at the initial timing collectively with a subsequently obtained still image at a timing of a next uploading.

5. A management system, comprising:
   - the on-vehicle device according to claim 1; and
   - the management computer, wherein the management computer aggregates and manages the still images uploaded from the on-vehicle device.

6. The on-vehicle device according to claim 1, further comprising:
   - a plurality of sensors provided on the vehicle, the plurality of sensors including a position sensor, a vehicle speed sensor, an acceleration sensor and a steering angle sensor, the plurality of sensors detecting running information of the vehicle, the running information including position information of the vehicle, speed information of the vehicle, acceleration information of the vehicle, and steering information of the vehicle, wherein
   - the processor is further configured to upload the running information in addition to the still image captured by the camera.

7. A management system comprising:
   - the on-vehicle device according to claim 1; and
   - the management computer, wherein the management computer includes a memory that stores the still images uploaded from the on-vehicle device.

8. The on-vehicle device according to claim 1, wherein:
a stoppage time of the vehicle, which is an amount of time that the vehicle is stopped, is counted starting from a time at which the processor performed a previous uploading of the still image.

9. The on-vehicle device according to claim 1, the on-vehicle device further comprising:
a communication unit configured to perform electronic two-way communication between the on-vehicle device and the management computer, wherein
the processor uploads the still image to the management computer via the communication unit.

10. The on-vehicle device according to claim 9, wherein the communication unit is a network interface card.

11. An upload method executed by a processor of an on-vehicle device located on a vehicle and includes a camera, the method comprising:
the processor uploading a still image captured by the camera provided on the vehicle to a management computer located externally of the vehicle, wherein
(a) when the vehicle is moving, the processor uploads the still image each time that the vehicle has moved by a running distance equal to a threshold distance, and
(b) when the vehicle is stopped, the processor uploads the still image periodically at a constant time interval.

12. The method according to claim 11, wherein:
a stoppage time of the vehicle, which is an amount of time that the vehicle is stopped, is counted starting from a time at which the processor performed a previous uploading of the still image.

13. The method according to claim 11, wherein the processor uploads the still image to the management computer via a communication unit of the on-vehicle device, the communication unit being configured to perform electronic two-way communication between the on-vehicle device and the management computer.

14. The method according to claim 13, wherein the communication unit is a network interface card.

* * * * *